United States Patent
Abbas et al.

(10) Patent No.: US 9,680,587 B2
(45) Date of Patent: Jun. 13, 2017

(54) TRAFFIC DIFFERENTIATION IN A TRANSPORT NETWORK

(75) Inventors: Ghani Abdul Muttalib Abbas, Nottingham (GB); John Ash, Nottingham (GB)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 13/576,208

(22) PCT Filed: Feb. 2, 2010

(86) PCT No.: PCT/EP2010/051240
§ 371 (c)(1),
(2), (4) Date: Oct. 15, 2012

(87) PCT Pub. No.: WO2011/095205
PCT Pub. Date: Aug. 11, 2011

(65) Prior Publication Data
US 2013/0039658 A1    Feb. 14, 2013

(51) Int. Cl.
*H04J 3/16*    (2006.01)
(52) U.S. Cl.
CPC .................................. *H04J 3/1652* (2013.01)
(58) Field of Classification Search
None
See application file for complete search history.

(56) References Cited

U.S. PATENT DOCUMENTS 5,588,121 A    12/1996  Reddin et al.
8,315,159 B2 *  11/2012  Monga et al. ................ 370/222

(Continued)

FOREIGN PATENT DOCUMENTS

CN    1246013 A    3/2000
CN    1362814 A    8/2002
(Continued)

OTHER PUBLICATIONS

PCT International Search Report, mailed Oct. 5, 2012, in connection with International Application No. PCT/EP2010/051240.
(Continued)

*Primary Examiner* — Donald Mills
(74) *Attorney, Agent, or Firm* — Leffler Intellectual Property Law, PLLC

(57) ABSTRACT

A Layer 1 transport network, such as an Optical Transport Network (OTN), transports traffic in Layer 1 data transport units. Traffic received at a node of the transport network is mapped to Layer 1 data transport units according to destination such that each Layer 1 data transport unit carries traffic for a particular destination of the transport network. The Layer 1 transport network can carry a plurality of different traffic types and the node can map the received traffic to Layer 1 data transport units according to destination and traffic type. Identification information can be added to an overhead section associated with the Layer 1 data transport unit to indicate at least one of: traffic type and destination of the traffic carried within the data transport unit. At a subsequent node, the Layer 1 data transport units are received and switched such that Layer 1 data transport units carrying traffic destined for other nodes bypass higher layer processing at the node and Layer 1 data transport units carrying traffic destined for the node are switched to a local output of the node.

19 Claims, 11 Drawing Sheets

(56) References Cited

U.S. PATENT DOCUMENTS

| | | | |
|---|---|---|---|
| 2002/0090007 A1 | 7/2002 | Kamiya et al. | |
| 2003/0061338 A1 | 3/2003 | Stelliga | |
| 2004/0151500 A1* | 8/2004 | Misawa et al. | 398/58 |
| 2006/0133430 A1 | 6/2006 | Nagesh et al. | |
| 2007/0076769 A1* | 4/2007 | Zou | 370/539 |
| 2007/0211750 A1 | 9/2007 | Li et al. | |
| 2008/0181203 A1 | 7/2008 | Jones et al. | |
| 2008/0271096 A1 | 10/2008 | Gazier et al. | |
| 2011/0080836 A1* | 4/2011 | Bragg et al. | 370/241.1 |
| 2012/0251106 A1* | 10/2012 | Valiveti et al. | 398/45 |

FOREIGN PATENT DOCUMENTS

| | | | |
|---|---|---|---|
| CN | 101394286 A | | 3/2009 |
| WO | 99/00935 A1 | | 1/1999 |

OTHER PUBLICATIONS

ITU-T Recommendation G.709/Y.1331 Series G: Transmission Systems and Media, Digital Systems and Networks, Digital terminal equipments—General; Series Y: Global Information infrastructure and Internet Protocol Aspects, Internet protocol aspects—Transport "Interfaces for the optical transport network (OTN)" Feb. 2001.

Chinese First Office Action, dated Aug. 29, 2014, in connection with counterpart Chinese Patent Application No. 201080063035.X, all pages.
Translation of Chinese First Office Action, dated Aug. 29, 2014, in connection with counterpart Chinese Patent Application No. 201080063035.X, all pages.
Chinese First Search Report, dated Aug. 14, 2014, in connection with counterpart Chinese Patent Application No. 201080063035.X, all pages.
Translation of Chinese First Search Report, dated Aug. 14, 2014, in connection with counterpart Chinese Patent Application No. 201080063035.X, all pages.
Chinese Fourth Office Action, dated Apr. 20, 2016, in connection with counterpart Chinese Patent Application No. 201080063035.X, all pages.
Translation of Chinese Fourth Office Action, dated Apr. 20, 2016, in connection with counterpart Chinese Patent Application No. 201080063035.X, all pages.
Chinese Fourth Search Report, dated Apr. 12, 2016, in connection with counterpart Chinese Patent Application No. 201080063035.X, all pages.
Translation of Chinese Fourth Search Report, dated Apr. 12, 2016, in connection with counterpart Chinese Patent Application No. 201080063035.X, all pages.

* cited by examiner

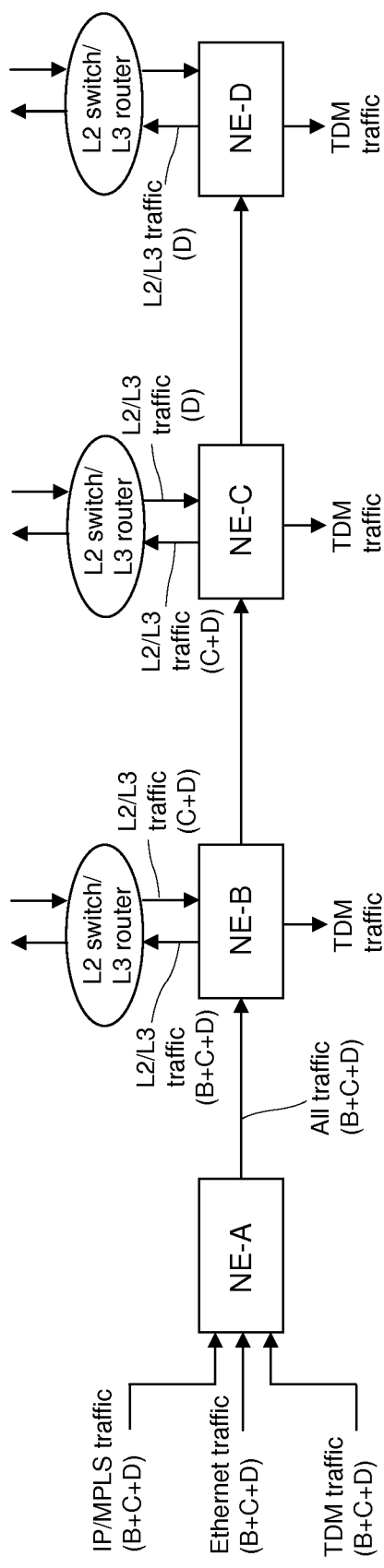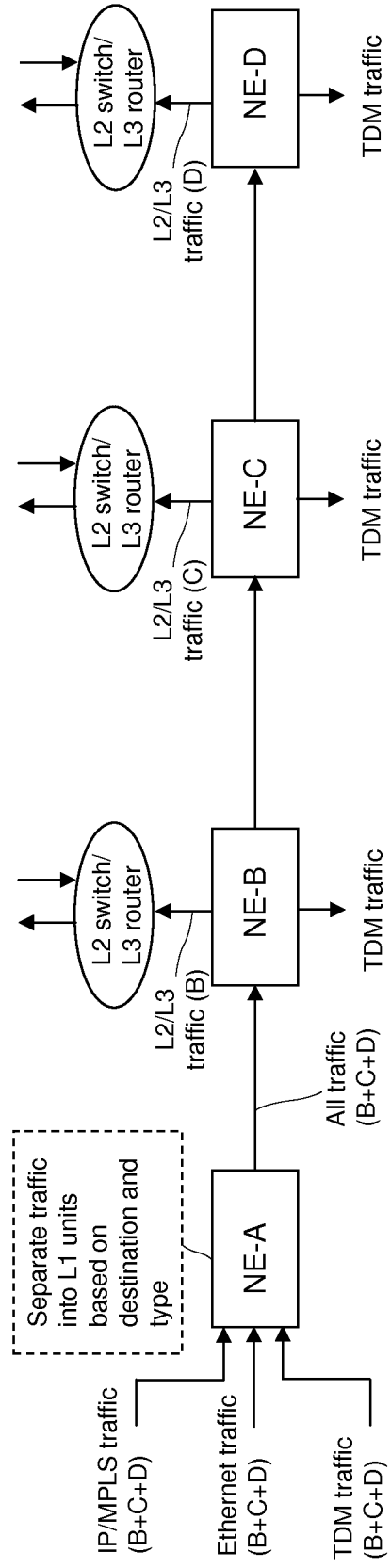
Fig. 1
Fig. 2

| Column<br>Row | 1........ | | 7 | 8........ | | | 14........ | 15 | 16 |
|---|---|---|---|---|---|---|---|---|---|
| 1 | FAS | | MFAS | SM | | GCC0 | RES | RES | JC |
| 2 | Delay meas | TCM AT | TCM6 | TCM5 | | TCM4 | FTFL | RES | JC |
| 3 | RES | | TCM2 | TCM1 | | PM | EXP | RES | JC |
| 4 | TCM3 | | APS/PCC | | RES | | | PSI | NJO |
| | GCC1 | GCC2 | | | | | | | PJO |

Fig. 9

TRAFFIC DIFFERENTIATION IN A TRANSPORT NETWORK

TECHNICAL FIELD

This invention relates to communication transport networks, and more particularly to Layer 1 transport networks such as the Optical Transport Network (OTN), and to methods of operating nodes in the transport network.

BACKGROUND

Current communication transport networks are designed to transport mixed packet and Time-Division Multiplexed (TDM) structured services. The packet traffic typically comprises Internet Protocol (IP)/Multi-Protocol Label Switched (MPLS) traffic and Ethernet traffic and the TDM traffic can comprise voice or data traffic.

A transport network is architecturally considered as comprising a set of layers, as defined in the Open System Interconnection (OSI) reference model, with: Layer 1 (L1) being the physical layer, such as optics/Dense Wavelength Division Multiplexed (DWDM), Layer 2 (L2) being the Data Link Layer, using such protocols as Ethernet/Medium Access Control (MAC); and Layer 3 (L3) being the Network Layer, using such protocols as Internet Protocol (IP). Each of these three layers offers switching using the technology associated with the individual layers. For example, Layer 1 (L1) can have Synchronous Digital Hierarchy (SDH)/Synchronous Optical Networking (SONET), Optical Transport Network (OTN) or optical switching, Layer 2 (L2) can have Ethernet switches and Layer 3 (L3) can have routers.

FIG. 1 shows an example Layer 1 (L1) transport network comprising four nodes A, B, C, D. Layer 1 network equipment NE-A, NE-B, NE-C, NE-D is provided at each node. A Layer 2 switch and Layer 3 router is also provided at each node. A L1 NE forwards traffic to, and receives traffic from, a local L2 switch/L3 router at each node. A mix of traffic types is received at the ingress of node A. In FIG. 1 the traffic comprises: IP/MPLS traffic destined for Nodes B, C and D; Ethernet traffic destined for Nodes B, C and D; and TDM traffic destined for Nodes B, C and D. The mix of traffic types is mapped to L1 transport units (e.g. Optical Data Units (ODU) in the case of an OTN L1 transport network) and transported to node B. For example, TDM traffic can be mapped to a Layer 1 transport unit ODU-1#1, Ethernet traffic can be mapped to a Layer 1 transport unit ODU-1#2, and IP/MPLS traffic can be mapped to a Layer 1 transport unit ODU-1#3. Typically, the set of ODU-1 units are multiplexed into a higher level unit, such as ODU-2, and transported across the OTN to NE-B. At the L1 network equipment NE-B at node B, the ODU-2 is demultiplexed to the ODU-1 level. The L1 transport unit ODU-1#1 carries TDM traffic for various destinations. Traffic destined for Node B is removed from the ODU-1#1 and local traffic requiring transport across the OTN is added to ODU-1#1. The L1 transport units carrying Ethernet and IP/MPLS traffic ODU-1#2, ODU-1#3 are forwarded to a L2 switch/L3 router local to node B and unpacked. The L2 switch/L3 router inspects Layer 2/3 headers to decide if any of the traffic is destined for node B or one of the local nodes served by a network connected to node B. If so, the traffic egresses the network from the Layer 2 switch/Layer 3 router. All other traffic, which is destined for other nodes in the transport network, together with any locally generated traffic, is returned to the Layer 1 NE-B and forwarded to node C. Nodes C and D operate in a similar manner as node B.

The arrangement described above has several disadvantages. At each NE higher level Layer 1 transport units must be demultiplexed into lower level Layer 1 transport units. Also, at Node B and Node C L2 switches and L3 routers must process all L2 and L3 traffic, which puts significant demand on the L2 switches and L3 routers, with the consequence of very high bit rate interfaces, switching/routing capacity, power consumption, footprint and cost. There is also processing of the lower level Layer 1 data units carrying TDM traffic to groom TDM traffic to/from the local nodes.

The present invention seeks to provide an alternative way of operating a Layer 1 transport network, such as an Optical Transport Network (OTN).

SUMMARY

An aspect of the present invention provides a method of processing traffic at a node of a Layer 1 transport network. The Layer 1 transport network is arranged to transport traffic across the network in Layer 1 data transport units. The method comprises receiving traffic at the node and mapping the received traffic to Layer 1 data transport units according to destination, such that the received traffic is segregated into Layer 1 data transport units, with each Layer 1 data transport unit carrying traffic for a particular destination of the transport network.

Traffic is differentiated according to destination. An advantage of operating nodes of the Layer 1 transport network in this manner is that lower switching/routing capacity is needed at Layer 2 switches/Layer 3 routers because significantly fewer data transport units are forwarded by the Layer 1 network equipment to the local Layer 2 switch/Layer 3 router and returned again to the Layer 1 network equipment. This can allow a lower bit rate interface between the Layer 1 network equipment and Layer 2 switch/Layer 3 router and has advantages of lower power consumption, smaller footprint and lower cost of Layer 2 switch and Layer 3 routers. Advantageously, the destination is an address of a Layer 1 node or a network equipment (e.g. Layer 2 switch or Layer 3 router) connected to a node of the Layer 1 transport network.

Advantageously, the Layer 1 transport network is configured to carry a plurality of different traffic types. The mapping comprises mapping the received traffic to Layer 1 data transport units according to destination and traffic type, such that the received traffic is segregated into Layer 1 data transport units, with each Layer 1 data transport unit carrying a particular one of the traffic types and traffic for a particular destination of the transport network. In this way, traffic is differentiated according to destination and traffic type. This can further reduce load on Layer 2 switches/Layer 3 routers.

The method can comprise adding identification information to an overhead section associated with the data transport unit to indicate at least one of: traffic type and destination of the traffic carried within the Layer 1 data transport unit.

For received traffic in packet form, the method can comprise inspecting a header of the packet for a destination address and performing a look-up of the destination address in a forwarding table to retrieve information about the mapping. The method can inspect a field such as a MAC address, IP address or MPLS label in the header of the packet.

The mapping can be a pre-configured mapping between a port/interface of the node and the Layer 1 data transport unit. The mapping can be configured by a management plane and/or a control plane of the transport network.

Another aspect of the invention provides a method of processing traffic at a node of a Layer 1 transport network. The Layer 1 transport network is arranged to transport traffic across the network in Layer 1 data transport units. The method comprises receiving Layer 1 data transport units at the node, wherein each Layer 1 data transport unit carries traffic which has been segregated according to destination of the traffic. The method further comprises switching the received Layer 1 data transport units such that Layer 1 data transport units carrying traffic destined for other nodes bypass higher layer processing at the node and Layer 1 data transport units carrying traffic destined for the node are switched to a local output of the node.

Advantageously, the Layer 1 transport network is configured to carry a plurality of different traffic types and the node receives Layer 1 data transport units which have been segregated according to destination of the traffic and traffic type. The method further comprises switching the received Layer 1 data transport units such that Layer 1 data transport units carrying traffic destined for other nodes bypass higher layer processing at the node and Layer 1 data transport units carrying traffic destined for the node are switched to a local output of the node connected to a processing unit for the traffic type carried by the Layer 1 data transport units. The processing unit can be a Layer 2 switch, a Layer 3 router or an MPLS router.

Other aspects of the invention provide apparatus for performing the described or claimed methods. In particular, another aspect of the invention provides network equipment for use at a node of a Layer 1 transport network which is arranged to transport traffic across the network in Layer 1 data transport units. The network equipment comprises an input for receiving traffic and a mapping unit arranged to map the received traffic to Layer 1 data transport units according to destination, such that the received traffic is segregated into Layer 1 data transport units, with each Layer 1 data transport unit carrying traffic for a particular destination of the transport network.

Advantageously, the Layer 1 transport network is configured to carry a plurality of different traffic types and the mapping unit is arranged to map the received traffic to Layer 1 data transport units according to destination and traffic type, such that the received traffic is segregated into Layer 1 data transport units, with each Layer 1 data transport unit carrying a particular one of the traffic types and traffic for a particular destination of the transport network.

Another aspect of the invention provides network equipment for use at a node of a Layer 1 transport network which is arranged to transport traffic across the network in Layer 1 data transport units. The network equipment comprises an input for receiving Layer 1 data transport units at the node, wherein each Layer 1 data transport unit carries traffic which has been segregated according to destination of the traffic. The network equipment also comprises a switching unit arranged to switch the received Layer 1 data transport units such that Layer 1 data transport units carrying traffic destined for other nodes bypass higher layer processing at the node and Layer 1 data transport units carrying traffic destined for the node are switched to a local output of the network equipment.

Advantageously, the Layer 1 transport network is configured to carry a plurality of different traffic types and the input is arranged to receive Layer 1 data transport units which have been segregated according to destination of the traffic and traffic type. The switching unit is arranged to switch the received Layer 1 data transport units such that Layer 1 data transport units carrying traffic destined for other nodes bypass higher layer processing at the node and Layer 1 data transport units carrying traffic destined for the node are switched to a local output of the network equipment connected to a processing unit for the traffic type carried by the Layer 1 data transport units.

Network equipment in the Layer 1 data transport network are able to segregate or groom traffic on the basis of destination, or destination and traffic type. This allows L1 network equipment at a node to switch data transport units carrying traffic for a particular destination either to a local port of the node, if the destination is that node, or to switch them directly to an output port of the network equipment, without referring them to a local Layer 2 switch or Layer 3 router, if the destination is another node. This allows a L1 network equipment to switch data transport units carrying traffic of a particular type directly to an output port for that traffic type (e.g. TDM interface, Layer 2 switch, Layer 3 router) without first sending the traffic to a L2 switch or a L3 router for segregation and forwarding to the relevant ports. This allows for transit traffic to be switched directly to the next node without being sent unnecessarily to a L2 switch or a L3 router.

Advantageously, the traffic is differentiated on the basis of traffic type and destination and thus reducing the traffic loads on the links between L1, L2 and L3 equipment. This results in reduced power consumption, equipment foot print and cost.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

The term "data" is intended to be broadly construed, and includes voice, data, video, multimedia and any other kind of traffic.

BRIEF DESCRIPTION OF THE DRAWINGS

Embodiments of the invention will be described, by way of example only, with reference to the accompanying drawings in which:

FIG. 1 shows a Layer 1 transport network;

FIG. 2 shows the transport network of FIG. 1 configured to operate according to an embodiment of the invention;

FIG. 9 shows the overhead section of ODUk and OTUk transport units;

DETAILED DESCRIPTION

Figure 3:
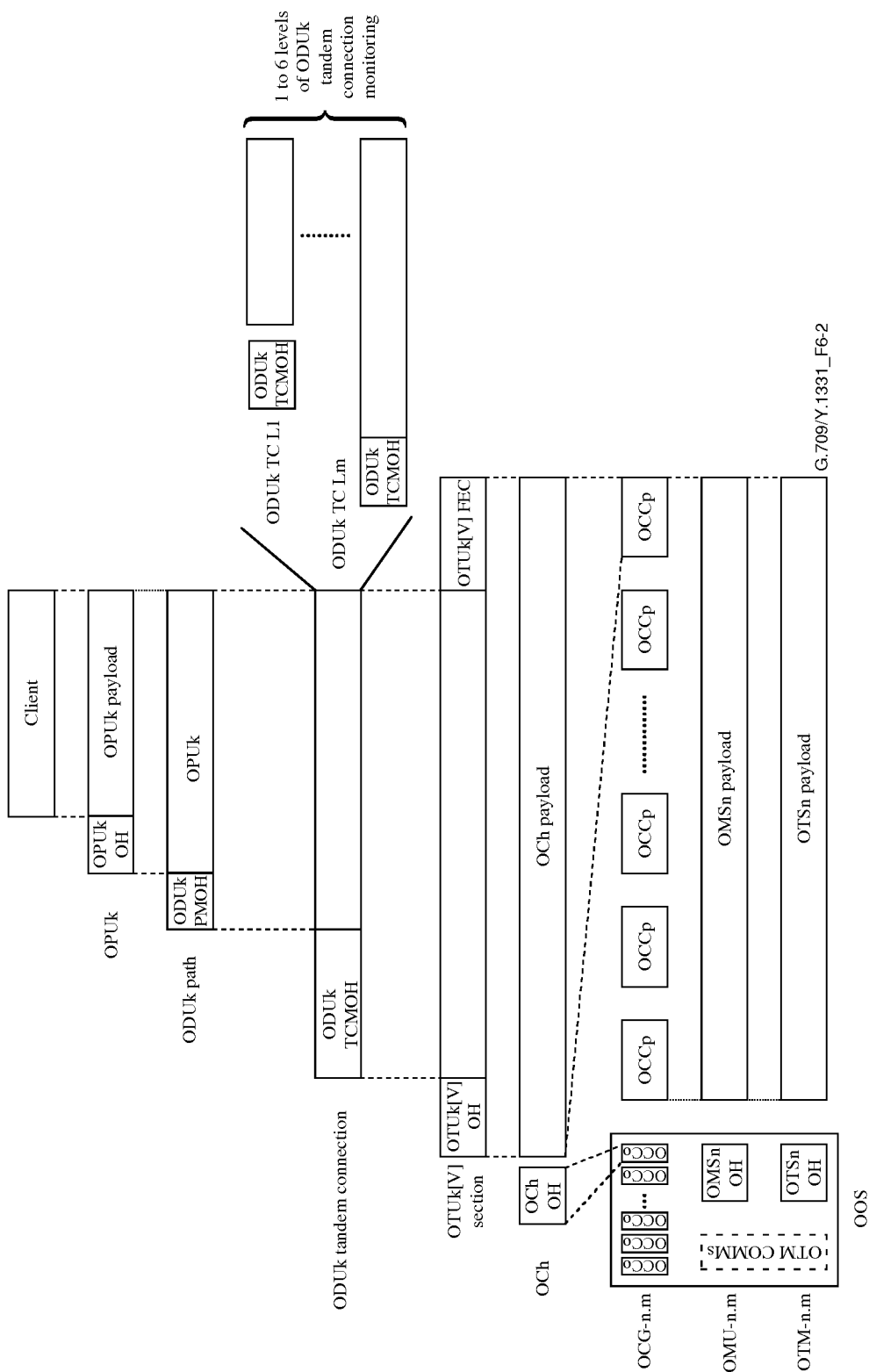
FIG. 3 shows the OTN hierarchy.

FIG. 2 shows a transport network according to an embodiment of the invention. The network has the same topology as FIG. 1. Traffic is received at the Layer 1 (L1) network equipment NE-A at node A. The traffic comprises a mix of traffic types (e.g. Ethernet, IP/MPLS, TDM), and traffic intended for different destination nodes (B, C, D) of the transport network. NE-A separates traffic according to at least one of: traffic type (e.g. Ethernet, IP/MPLS, TDM) and destination (node B, node C, node D). In the case of an OTN L1 transport network, traffic is mapped to Optical Data Units (ODU). NE-A can map traffic to transport units according to destination. NE-A can operate as follows:

map traffic for Node B→ODU-2#1;
map traffic for Node C→ODU-2#2;
map traffic for Node D→ODU-2#3.

At Node B, ODU-2#1 is switched to a local output port. ODU-2#2 and ODU-2#3 are switched directly to an output port, or ports, without local processing at Node B.

NE-A can map traffic to transport units according to destination and traffic type, as shown in FIG. 2. NE-A can operate as follows:

map IP/MPLS traffic for Node B→ODU-2#1;
map Ethernet traffic for Node B→ODU-2#2;
map TDM traffic for Node B→ODU-2#3;
map IP/MPLS traffic for Node C→ODU-2#4;
map Ethernet traffic for Node C→ODU-2#5;
map TDM traffic for Node C→ODU-2#6;
map IP/MPLS traffic for Node D→ODU-2#7;
map Ethernet traffic for Node D→ODU-2#8;
map TDM traffic for Node D→ODU-2#9.

At Node B, ODUs are processed in a similar way as described above, but with a finer granularity, as traffic has now been segregated according to destination and traffic type. ODU-2#1, ODU-2#2 and ODU-2#3 are switched to local output ports. ODU-2#1 is switched to a port which connects to a router for processing IP/MPLS traffic, ODU-2#2 is switched to a port which connects to a switch for processing Ethernet traffic and ODU-2#3 is switched to a port which connects to equipment for processing TDM traffic. ODU-2#4-ODU-2#9 are switched directly to an output port, or ports, of Node B without local processing at Node B, thereby bypassing the L2 switching layer and/or L3 routing layer.

In each of these cases there is reduced processing of traffic at the L2/L3 layers. It should be understood that ODU-2 is used in the above illustration as an example of an OTN ODU that traffic can be mapped to. The mapping schemes described above are for explanation, and other mapping schemes can be used. The mapping can map traffic to any one, or mix of, ODUs defined in G.709, including ODUflex. The multiplexing structure of OTN multiplexes four ODU-2 units into an ODU-3 unit, and ten ODU-2 units into an ODU-4 unit. When multiplexing ODUs, it is possible to multiplex lower order ODUs carrying different traffic types and/or traffic destined for different destinations to form a higher level ODU unit. Where there is a high volume of traffic to a particular destination, it is possible to allocate a particular wavelength channel, called a lambda, to that traffic flow. The lambda only requires optical switching at intermediate nodes, without the need for electrical domain processing of ODUs.

As background information, it is considered helpful to give an overview of the hierarchy of the Optical Transport Network (OTN). FIG. 3 shows the hierarchical layers used in transporting data over an OTN. Client data can include Ethernet frames, TDM traffic, IP/MPLS packets and various other traffic types. Referring to FIG. 3, client data is encapsulated with an OPUk payload area and OPUk overhead is added to form an Optical Channel Payload Unit (OPUk), with k taking a value k=0,1,2,3,4 and indicating a particular one of the multiple supported bit rates. The OPUk is intended to be carried end-to-end between a source and sink and is not modified by the network. An Optical Channel Data Unit (ODUk) comprises a payload of an OPUk with an ODUk overhead. Again, the letter k can take a value k=0,1,2,3,4 and indicates a nominal bit rate, e.g. ODU1=2.5 Gbps, ODU2=10 Gbps, ODU3=40 Gbps and ODU4=100 Gbps. An Optical Channel Transport Unit (OTUk) comprises an ODUk with an OTUk overhead and forward error correction. Finally, an optical channel (OCh) is the optical signal which comprises an OTUk. The OPUk, ODUk and OTUk are in the electrical domain. The OCh is carried in the optical domain and will be carried over a particular optical wavelength channel of a WDM or DWDM or CWDM transmission system. Additional layers exist in the optical domain, beneath the optical channel. These include an Optical Multiplex Section (OMS), an Optical Transmission Section (OTS) and an Optical Physical Section (OPS). There is a range of ways in which OPU, ODU and OTU units can be multiplexed, as detailed in ITU-T recommendation G.709.

Figure 4:
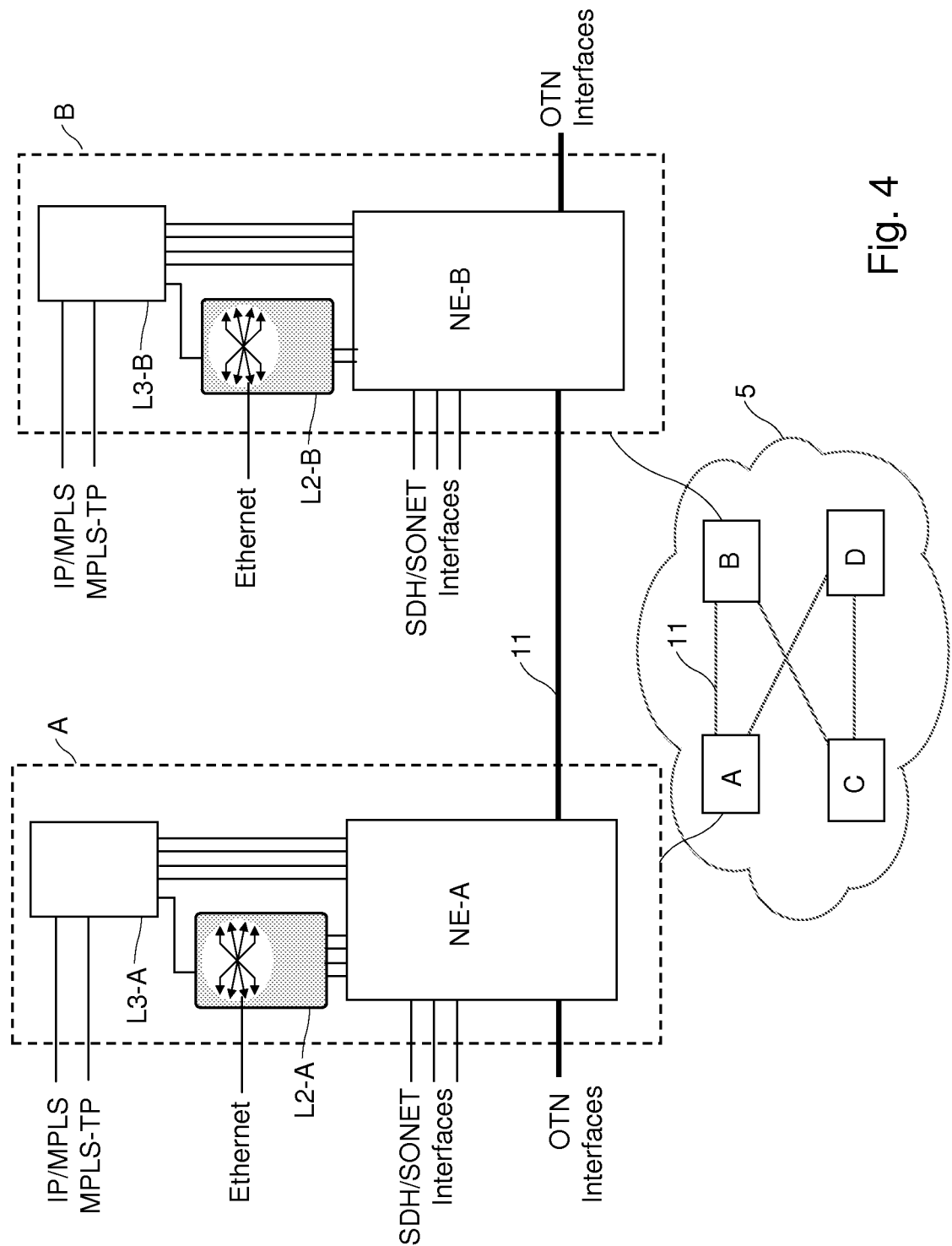
FIG. 4 shows network equipment at nodes of the Layer 1 transport network.

An embodiment of the invention applied to an Optical Transport Network (OTN) will now be described. FIG. 4 shows an OTN transport network 5 with nodes A-D. Equipment at nodes A and B is shown alongside the nodes. At node A there is OTN L1 network equipment NE-A, a Layer 2 switch L2-A and a Layer 3 router L3-A. NE-A connects to other L1 network equipments via optical links 11. In an OTN network traffic is carried on wavelength channels. FIG. 4 shows a L1 network 5 having a simple mesh topology, and the network can have any suitable topology, such as point-to-point, ring, interconnecting rings or mesh. NE-A comprises a cross-connect function and ingress/egress functions to interface with other network equipments. NE-A interfaces with SDH/SONET networks and to the Layer 2 switch L2-A and Layer 3 router L3-A. The Layer 3 router L3-A has a range of network interfaces, such as an IP/MPLS interface and an MPLS-TP interface. The Layer 2 switch L2-A and Layer 3 router L3-A can be connected to one other.

Figure 5:
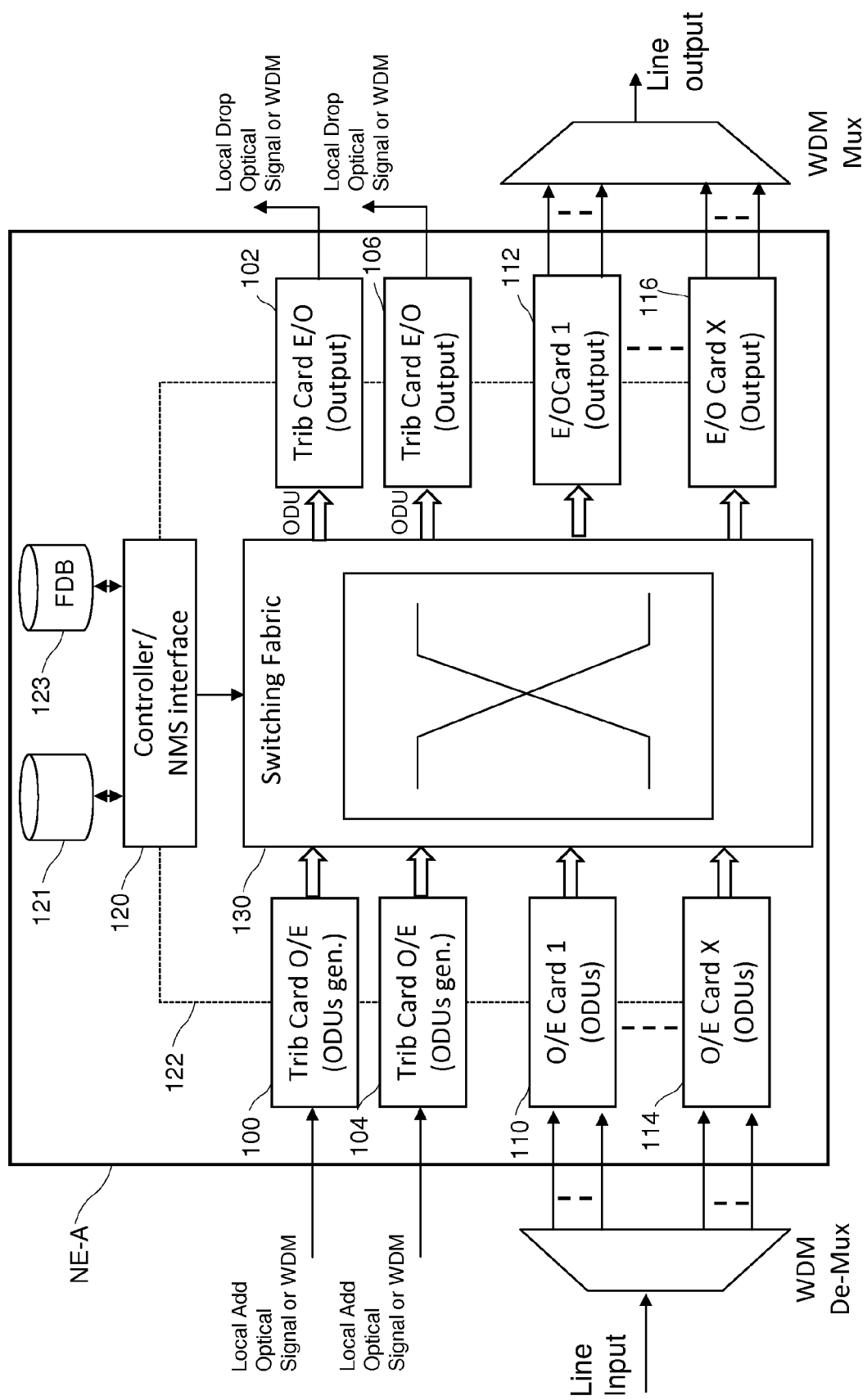
FIG. 5 shows network equipment at one of the nodes of FIG. 4.

FIG. 5 shows an overview of network equipment NE-A at one of the transport network nodes. A set of line cards interface with the optical links to other nodes. The line cards have an input section 110, 114 and an output section 112, 116. Typically, the optical links are Wavelength Division Multiplexed (WDM) or Dense Wavelength Division Multiplexed (DWDM) links. Tributary line cards 100-106 connect to links, or network equipments, carrying local traffic. Tributary line cards 104, 106 (one is shown in FIG. 5) connect to TDM networks. Other tributary line cards 100, 102 (one is shown in FIG. 5) connect to the Layer 2 switch L2-A or Layer 3 router L3-A. A controller 120 controls operation of the line cards 100-116 and the switching fabric 130. A switching table 121 specifies connections across the switching fabric 130, i.e. which input port should be connected to each output port. Switching table 121 is configured by a management plane or control plane of the transport network.

Figure 6:
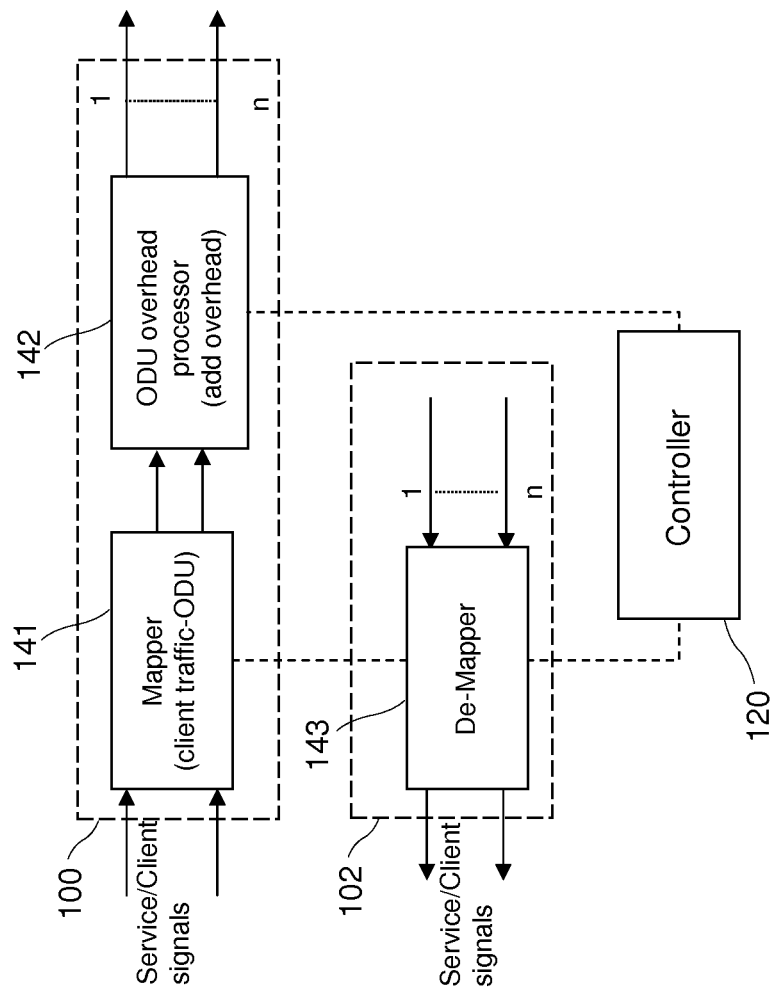
FIG. 6 shows a tributary line card in the network equipment of FIG. 5.

FIG. 6 shows the input and output sections 100, 102 of a tributary line card. A mix of traffic types (e.g. IP/MPLS, Ethernet and TDM format) is received at input ports of the line card 100 and mapped by a mapper 141 to ODU transport units. Traffic is mapped to ODUs based on traffic type and/or destination, such that each ODU carries traffic with a particular traffic type and/or traffic with a particular destination in the transport network 5. An ODU overhead processor 142 adds the ODU overhead data. Processor 142 communicates with a controller 120. In an embodiment, processor 142 adds data to the overhead section of an ODU which indicates destination of the traffic carried within the ODU. In an embodiment, processor 142 adds data to the overhead section of an ODU which indicates the type of traffic carried within the ODU. In the output section 102 of the line card, ODUs are received and the traffic is de-mapped 143 to the correct output port.

Figure 7:
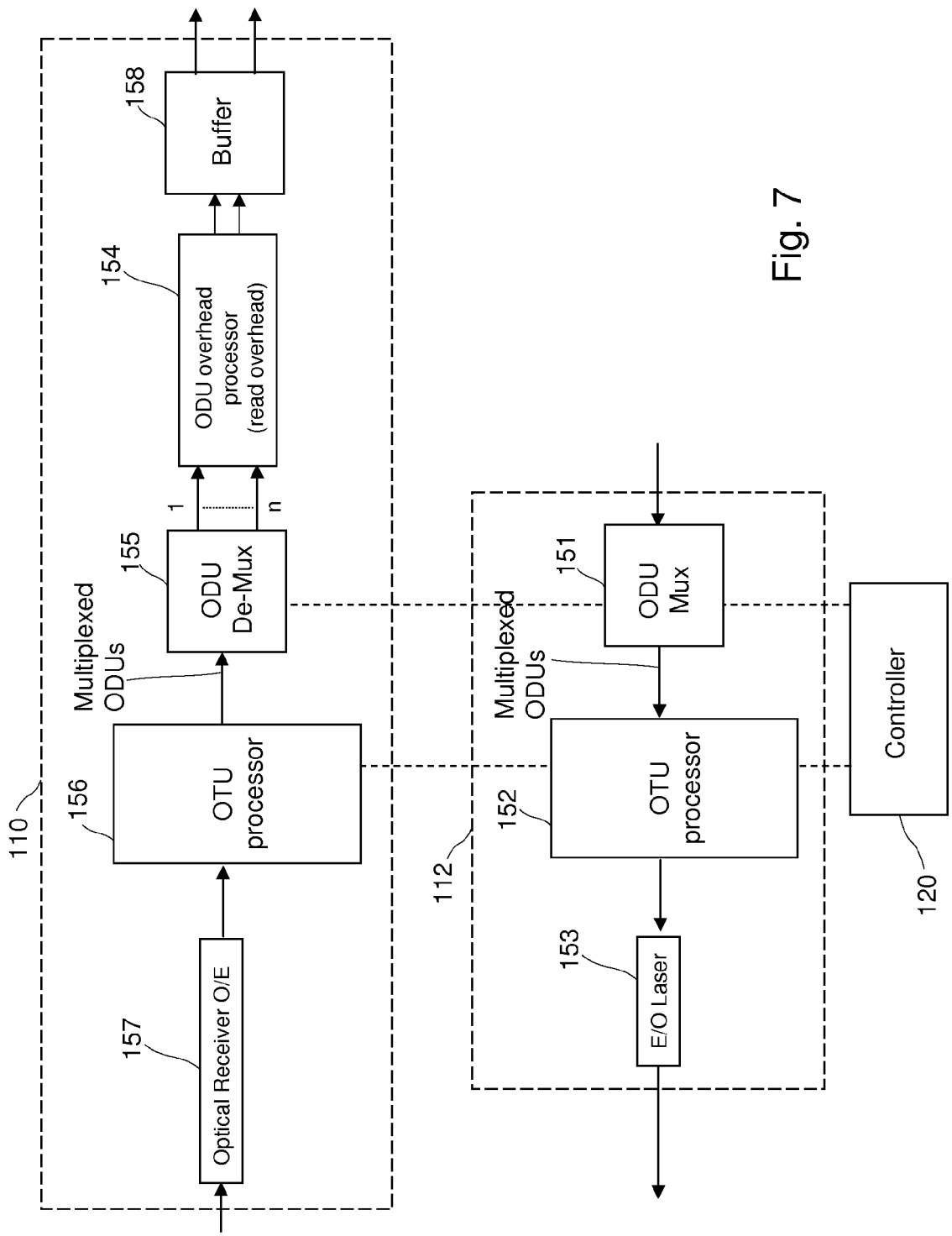
FIG. 7 shows an OTN line card in the network equipment of FIG. 5.

FIG. 7 shows the input and output sections 110, 112 of an OTN line card. Optical signals are received at an input to the line card. For a WDM system, a demux function demultiplexes the wavelength channels and applies a wavelength channel to an optical receiver 157 of the input section 110. An electrical signal is output to an OTU processor 156. OTU processor 156 inspects the overhead section of each OTU. In an embodiment of the invention, the overhead section of an OTU carries data which indicates destination of the traffic carried within the OTU. In an embodiment of the invention, the overhead section of an OTU carries data which indicates type of the traffic carried within the OTU. Processor 156 communicates with a controller 120. An OTU can carry a multiplex of ODUs. ODUs are demultiplexed 155 and applied to an ODU overhead processor 154. ODU processor 154 inspects the overhead section of each ODU. The overhead section of an ODU can carry data which indicates destination of the traffic carried within the ODU and/or data which indicates type of the traffic carried within the ODU. Processor 154 communicates with a controller 120. Data which indicates traffic destination/traffic type may be carried at one, or both, of the ODU and OTU levels. Buffer 158 buffers ODUs for forwarding across the switching fabric 130.

In the output section 112 of an OTN line card, ODUs are received from the switching fabric 130 and multiplexed 151 into an OTU. In embodiments, the OTU processor 152 adds data into an overhead section of each OTU. In an embodiment the processor 152 adds data to the overhead section of an OTU which indicates destination of the traffic carried within the OTU. In an embodiment the processor 152 adds data to the overhead section of an OTU which indicates type of the traffic carried within the OTU. OTU processor 152 outputs a processed signal to a laser 153 to form a modulated optical signal on a wavelength channel. Multiple line cards output optical signals on different wavelength channels.

Input traffic to tributary line cards is mapped to different ODUs based on traffic characteristics, i.e. according to traffic destination, or according to destination and traffic type. The NE can operate in one or more of the following ways:

1. A Network management system (NMS) provisions ports/interfaces for certain types of traffic and/or specific destinations. Mapper 141 maps traffic from a particular port/interface into a particular ODU. At NEs within the OTN, a switching path is established for the ODUs to ensure that ODUs reach a particular destination. The switching path is configured by entries in the switching table 121 at each NE.

2. A Control Plane (CP) provisions ports/interfaces for certain types of traffic and/or specific destinations, similar to the NMS above.

3. A hybrid of a NMS and CP (e.g. Generalised Multi-Protocol Label Switching (GMPLS)) provisions ports/interfaces for certain types of traffic and/or specific destinations, similar to the NMS above.

4. Implement a Forwarding Data Base (FDB) in the NE. FIG. 5 shows a FDB at the controller 120, or an individual FDB can be provided at each tributary card 100, 104. For Ethernet traffic, the MAC address in the Ethernet frame is inspected and traffic is assigned to specific ODUs based on a look-up of the Ethernet address in the FDB. For MPLS/MPLS-TP traffic the Label address (LSP) carried by a Label-Switched data unit is inspected and traffic is assigned to specific ODUs. These ODUs are transported over the OTN and dropped at the relevant OTN cross-connect or Ethernet switch/destination or router. For this option, a L2/L3 packet inspection function is required at the NE.

5. Carry information in the overhead section of the transmitted OTN signal which labels, or identifies, the traffic carried within L1 transport units. This information can be used for L1 signalling and/or routing. Some of the spare bit/bytes in the OPU/ODU/OTU overhead section, as defined in G.709, can be used for this purpose. The overhead section can identify characteristics of the traffic carried in ODUs, such as traffic destination, or traffic destination and traffic type. A switching table (121, FIG. 5) at each intermediate node stores associations between ODUs and output ports to allow the NE to switch ODUs after inspection. Each association can be an association between a label carried in the overhead section and a port of the NE-A. The information carried in the overhead section can take different forms.

In one example, the information in the overhead section can directly indicate the destination of the traffic or the type of traffic (e.g. this ODU contains TDM/L2/L3 traffic) in an agreed way, known to all NEs, so that other NEs can inspect the label and know that they should switch to a TDM/L2/L3 output port. Each NE has a set of switching rules, e.g. switch L2 traffic to port X, switch L3 traffic to port Y and so on. For example, consider one reserved byte of the overhead section is used to carry this information. The byte identifies the traffic type in the ODUs. A simple bit oriented coding of this byte offers 256 unique codes. For example, code value (00000001) indicates TDM traffic, code value (00000010) indicates Ethernet traffic and code value (00000011) indicates IP/MPLS traffic. Each NE on the path can inspect this byte to identify the type of traffic being transported by the ODU. Furthermore, rules can be assigned that determine forwarding at the NE. For example: if the code value is 4, traffic is destined for port 4 on the NE which is connected to a L2 switch at node B; if the code value is 5, traffic is destined for port 5 which is connected to a L3 router at node B, and so on.

In another example, the information in the overhead section is used as a label to identify a traffic flow. The label, and switching instructions for ODUs carrying that label, are distributed to other NEs so that the NEs can correctly switch ODUs carrying that traffic flow.

Traffic can be mapped to ODUs with a finer granularity, based on other properties of the traffic, such as a Class of Service (CoS) or Priority.

At NE-A, ODUs arriving at an OTN line card 110, 114 are forwarded across the switching fabric 130 according to the type of traffic carried within an ODU and/or according to the destination of the traffic carried within an ODU. In this manner, only traffic that is intended to router L3-A is forwarded to a tributary line card 102 connected to the router L3-A. TDM traffic is forwarded to a tributary line card 102 connected to a TDM link. Other traffic received at an OTN line card 110, 114 is forwarded to an appropriate output OTN line card 112, 116, by-passing the local router L3-A. As explained above, the switching can be achieved by a mapping between ports of the input and output OTN cards, which has been pre-configured by the management plane (NMS) or control plane. Alternatively, the input OTN line cards 110, 114 can inspect the ODU/OTU overhead sections for data which indicates how the ODUs are to be forwarded.

Embodiments described above segregate traffic at the level of ODUs (i.e. traffic mapped to ODUs on the basis of traffic destination, or destination and type) and perform switching of ODUs in the electrical domain. It is also possible to segregate traffic at the level of wavelength channels (i.e. traffic mapped to wavelength channels on the basis of traffic destination, or destination and type) and perform switching at the level of wavelength channels. Switching of wavelength channels can be performed in the optical or electrical domains. It is also possible to have multiple levels of switching within the L1 network, with switching of wavelength channels, and a higher layer of OTN switching (e.g. at the ODU level).

Figure 8:
FIG. 8 shows the ODUk and OTUk frame structure.

FIG. 8 shows the format of an OTUk and ODUk frame, where k=1,2,3,4. There are overhead sections for the OTU, ODU and OPU. FIG. 9 shows the ODUk and OTUk overhead section of the frame in more detail. The fields shown in FIG. 9 are:
ACT: Activation/deactivation control channel;
APS: Automatic Protection Switching coordination channel;
EXP: Experimental;
FAS: Frame Alignment Signal;
FTFL: Fault Type & Fault Location reporting channel;
GCC: General Communication Channel. For ODU multiplexing two PJO bytes are allocated;
MFAS: MultiFrame Alignment Signal;
PCC: Protection Communication Control channel;
PM: Path Monitoring;
PSI: Payload Structure Identifier;
RES: Reserved for future international standardisation;
SM: Section Monitoring;
TCM: Tandem Connection Monitoring.
Embodiments of the invention use some bits/bytes in the overhead section as a messaging channel which can carry a label or some other identifier indicative of the destination, and/or can indicate the type of traffic. Example of overhead bytes in the OTN frame which may be used as a signalling/messaging channel are GCC0, GCC1, GCC2, RES, EXP.

Figure 10:
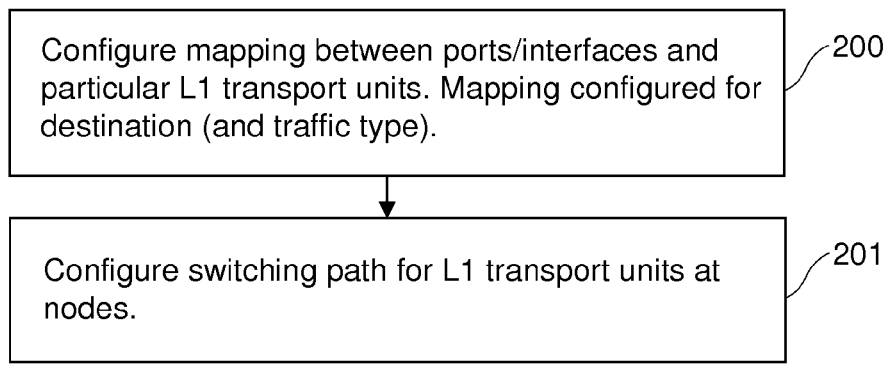
FIGS. 10 to 12 show an embodiment of methods of configuring and operating a transport network.
Figure 11:
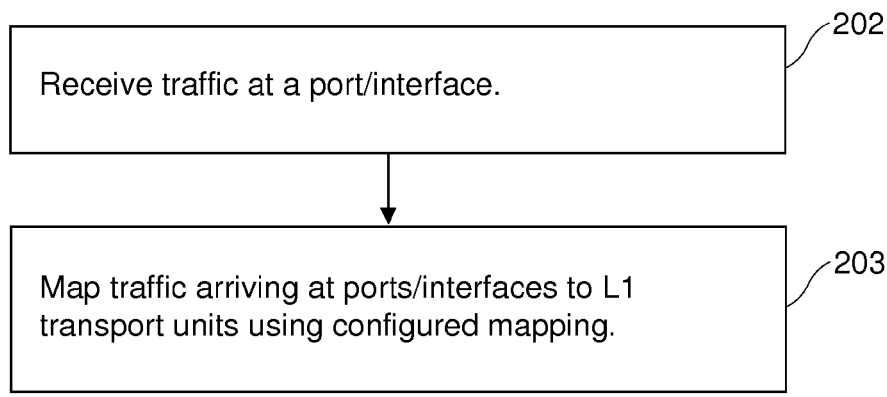
Figure 12:
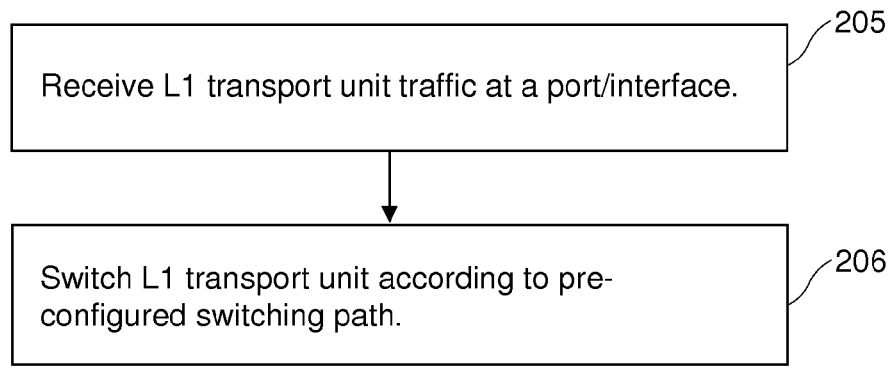

FIGS. 10 to 12 show methods of configuring and operating nodes of the L1 transport network where a mapping between ports and L1 transport units is used. FIG. 10 shows a method of configuring NEs in a transport network using a management plane or control plane. For each new traffic flow, a NE where the traffic flow ingresses the L1 transport network is configured at step 200. Step 200 configures a mapping between ports/interfaces of the NE and particular L1 transport units (e.g. ODUs) that will carry the traffic flow. The mapping is configured based on destination, or destination and traffic type. Also, for each new traffic flow, step 201 configures a switching path for L1 transport units at each NE along the path of the traffic flow. This will either cause the node to switch the L1 transport units to an output section of a tributary card, or to an output section of an OTN card, bypassing local processing.

FIG. 11 shows a method of processing traffic at a tributary card of a NE at which the traffic flow ingresses the L1 transport network. The NE has previously been configured using the method of FIG. 10, step 200. At step 202, traffic is received at a port/interface of a tributary card of the NE. Step 203 maps traffic from ports/interfaces to L1 transport units using the mapping previously configured at step 200.

FIG. 12 shows a method of processing L1 transport units traffic at an intermediate NE along a path of the traffic flow. The NE has previously been configured using the method of FIG. 10. At step 205 a L1 transport unit (e.g. ODU) is received at an input section of an OTN line card. Step 206 switches the transport unit according to the switching path previously configured at step 201. The switching path can switch the L1 transport unit to an output section 102, 106 of a tributary card, or to an output section 112, 116 of an OTN card.

Figure 13:
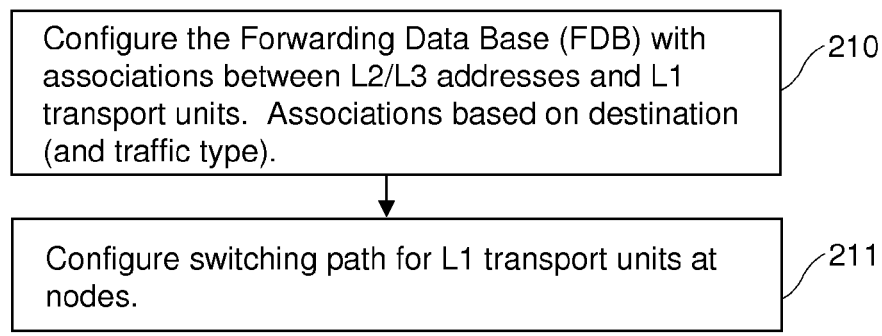
FIGS. 13 to 15 show another embodiment of methods of configuring and operating a transport network.
Figure 14:
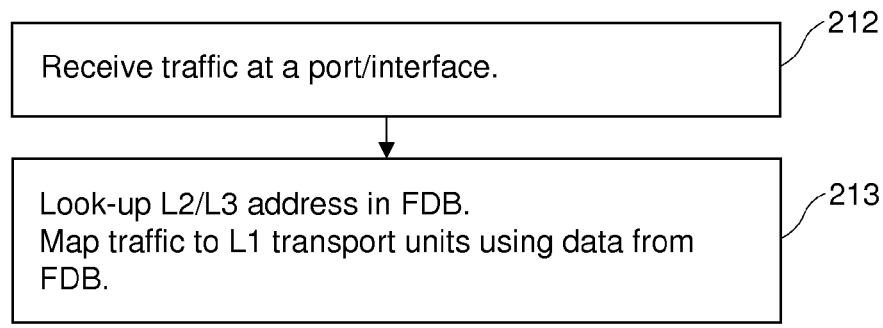
Figure 15:
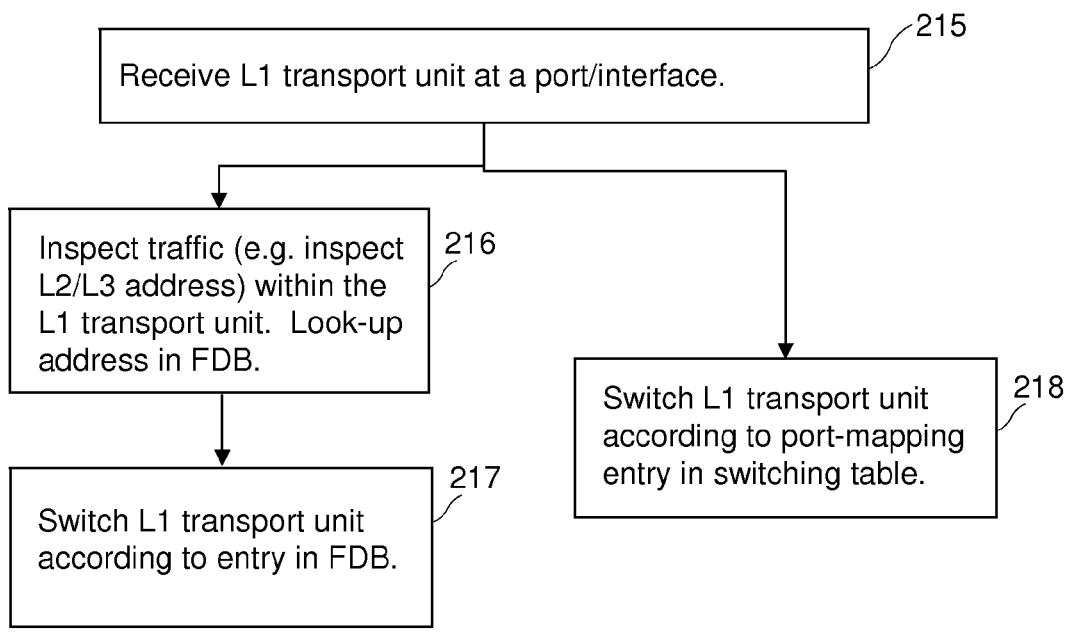

FIGS. 13 to 15 show methods of configuring and operating nodes of the L1 transport network where a Forwarding Data Base (FDB) is used to map between traffic and L1 transport units. FIG. 13 shows configuration of NEs For each new traffic flow, a NE where the traffic flow ingresses the L1 transport network is configured at step 210. Step 210 configures the Forwarding Data Base (FDB), (123, FIG. 5), with associations between L2/L3 addresses and L1 transport units. The associations cause traffic for different destinations to be mapped to different L1 transport units. Advantageously, the associations also map different traffic types to different L1 transport units. Also, for each new traffic flow, a NE along the path of the traffic flow is configured with a switching path, at step 211. Step 211 can configure the switching path by configuring a port-mapping (i.e. an instruction to forward transport units received on a particular input port to a particular output port) or a FDB. This will either cause the node to switch the L1 transport units to an output section of a tributary card, or to an output section of an OTN card, bypassing local processing.

FIG. 14 shows a method of processing traffic at a tributary card of a NE at which the traffic flow ingresses the L1 transport network. The NE has previously been configured using the method of FIG. 13. At step 212 a L1 transport unit (e.g. ODU) is received at a port/interface of a tributary card. Step 213 looks up the L2/L3 address of the received traffic in the FDB configured at step 210 and maps traffic to transport units using data received during the look-up in the FDB.

FIG. 15 shows a method of processing L1 transport units traffic at an intermediate NE along a path of the traffic flow. The NE has previously been configured using the method of FIG. 13. At step 215 a L1 transport unit (e.g. ODU) is received at an input section of an OTN line card. The method can proceed in one of two ways. In a first option, beginning at step 216, the contents of the L1 transport unit are inspected. Advantageously, this inspects the address of a L2 or L3 data unit and then performs a look-up of the address in a FDB stored at the NE. This indicates an output port for that traffic. At step 217 the L1 transport unit is switched using the information obtained from the FDB. In a second option, at step 218, the L1 transport unit is switched according to the switching path previously configured at step 211. The switching path can switch the L1 transport unit to an output section 102, 106 of a tributary card, or to an output section 112, 116 of an OTN card.

Figure 16:
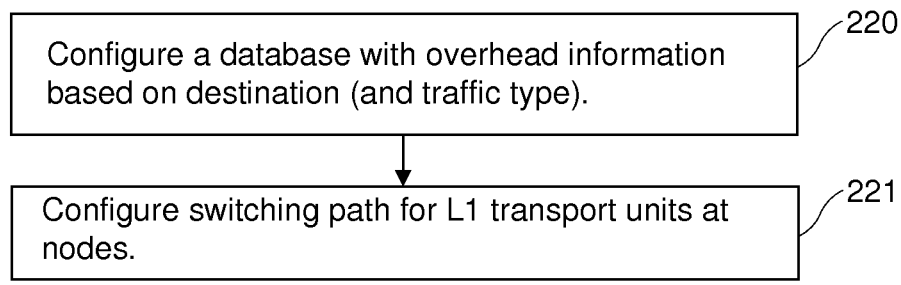
FIGS. 16 to 18 show an embodiment of methods of configuring and operating a transport network.
Figure 17:
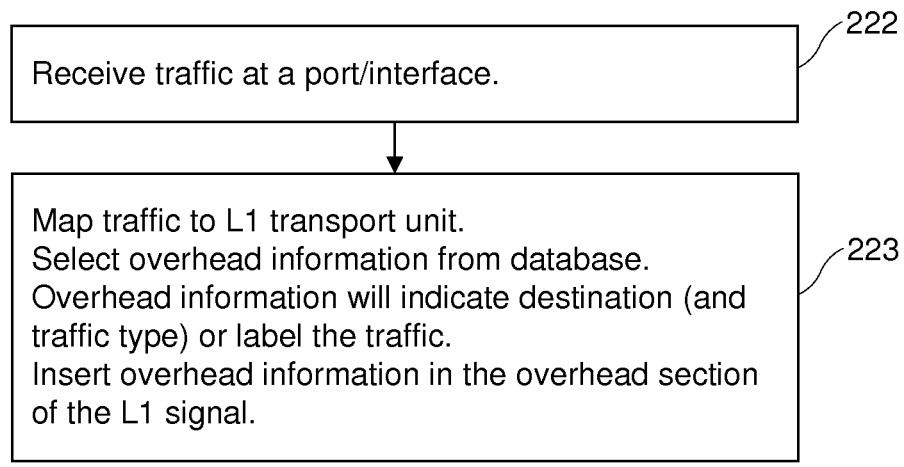
Figure 18:
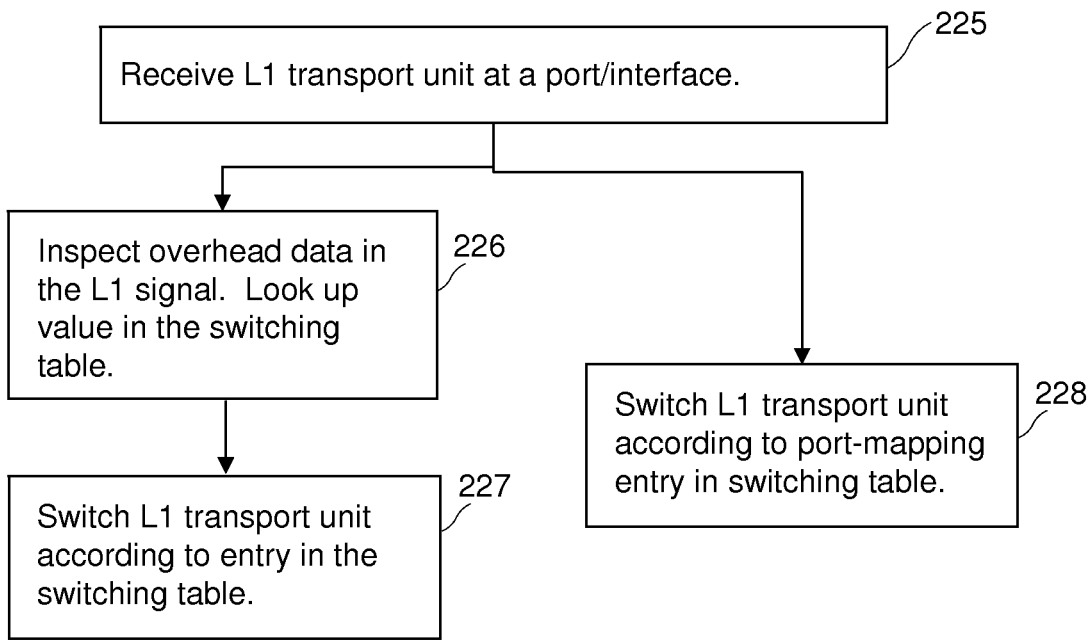

FIGS. 16 to 18 show methods of configuring and operating nodes of the L1 transport network where information is added to the overhead section of L1 transport units. FIG. 16 shows configuration of NEs. Step 220 configures a database with overhead information for insertion into overhead sections associated with L1 transport units. The overhead information is used to indicate destination (and traffic type), or to label traffic flows, as described above. The overhead information can be associated with ports of the NE (e.g. for all traffic received on port X, map to L1 transport unit Y and insert overhead information Z), or can be associated with some characteristic of the traffic flow (e.g. MPLS label value or destination address). Also, for each new traffic flow, a NE along the path of the traffic flow is configured at step 221. Step 221 configures a switching path for L1 transport units at each NE along the path. This will either cause the node to switch the L1 transport units to an output section of a tributary card, or to an output section of an OTN card, bypassing local processing. The switching path is configured with a table of overhead information values and port values, or a port-mapping.

FIG. 17 shows a method of processing traffic at a tributary card of a NE at which the traffic flow ingresses the L1 transport network. The NE has previously been configured using the method of FIG. 16. At step 222 a L1 transport unit (e.g. ODU) is received at a port/interface of a tributary card. Step 223 maps the traffic to a L1 transport unit based on information in the database configured at step 220. Step 223 also selects appropriate overhead information from the database and inserts the information in the overhead section of the L1 signal.

FIG. 18 shows a method of processing L1 transport units traffic at an intermediate NE along a path of the traffic flow. The NE has previously been configured using the method of FIG. 16. At step 225 a L1 transport unit (e.g. ODU) is received at an input section of an OTN line card. The method can proceed in one of two ways. In a first option, beginning at step 226, the contents of the overhead section of the L1 transport stream are inspected. Advantageously, this inspects a label or other identifier carried in the overhead section associated with that L1 transport unit (e.g. the ODU overhead section), or a higher or lower level transport unit (e.g. the OPU or OTU overhead section), which carries information about the received L1 transport unit. The method then performs a look-up of the label in a database stored at the NE. This indicates an output port for that traffic. At step 227 the L1 transport unit is switched using the information obtained from the database. In a second option, at step 228, the L1 transport unit is switched according to the switching path previously configured at step 221. The switching path can switch the L1 transport unit to an output section 102, 106 of a tributary card, or to an output section 112, 116 of an OTN card.

The invention is not limited to the embodiments described herein, which may be modified or varied without departing from the scope of the invention.

The invention claimed is:

1. A method of processing traffic at a node of a Layer 1 transport network which is arranged to transport traffic across the network in Layer 1 data transport units, the method comprising:
   receiving traffic at the node, wherein the received traffic is in the form of Layer 1 data transport units of a first level and wherein the received Layer 1 data transport units of the first level are not all intended for a same destination; and
   producing Layer 1 data transport units of a second level that is different from the first level by mapping the received Layer 1 data transport units of the first level to the Layer 1 data transport units of the second level that is different from the first level, wherein the mapping is at least according to destination, such that the received traffic is segregated into Layer 1 data transport units of the second level, with each Layer 1 data transport unit of the second level carrying a plurality of Layer 1 data transport units of the first level that are each destined for only a same particular destination of the transport network,
   wherein the Layer 1 transport network is configured to carry a plurality of different traffic types and the mapping comprises mapping the received traffic to Layer 1 data transport units of the second level according to destination and traffic type, such that the received traffic is segregated into Layer 1 data transport units of the second level, with each Layer 1 data transport unit of the second level carrying a particular one of the traffic types and traffic for a particular destination of the transport network.

2. A method according to claim 1 further comprising adding identification information to an overhead section associated with the Layer 1 data transport unit of the second level to indicate at least one of: traffic type and destination of the traffic carried within the Layer 1 data transport unit of the second level.

3. A method according to claim 1 wherein the mapping is a pre-configured mapping between a port/interface of the node and the Layer 1 data transport unit of the second level.

4. A method of processing traffic at a node of a Layer 1 transport network which is arranged to transport traffic across the network in Layer 1 data transport units of a higher level, the method comprising:
   receiving Layer 1 data transport units of the higher level at the node, wherein each Layer 1 data transport unit of the higher level carries Layer 1 data transport units of a given level that is lower than the higher level and which have been segregated at least according to destination of the traffic such that each Layer 1 data transport unit of the higher level carries a plurality of Layer 1 data transport units of the given level that are each destined for only a same particular destination of the transport network; and
   switching the received Layer 1 data transport units of the higher level according to destination, wherein switching comprises:
   switching the received Layer 1 data transport units of the higher level such that Layer 1 data transport units of the higher level carrying traffic destined for other nodes bypass higher layer processing at the node; and
   switching the received Layer 1 data transport units of the higher level such that Layer 1 data transport units of the higher level carrying traffic destined for the node are switched to a local output of the node.

5. A method of processing traffic at a node of a Layer 1 transport network which is arranged to transport traffic across the network in Layer 1 data transport units, the method comprising:
   receiving traffic at the node, wherein the received traffic is in the form of Layer 1 data transport units of a first level and wherein the received Layer 1 data transport units of the first level are not all intended for a same destination; and
   producing Layer 1 data transport units of a second level that is different from the first level by mapping the received Layer 1 data transport units of the first level to the Layer 1 data transport units of the second level that is different from the first level, wherein the mapping is at least according to destination, such that the received traffic is segregated into Layer 1 data transport units of the second level, with each Layer 1 data transport unit of the second level carrying a plurality of Layer 1 data transport units of the first level that are each destined for only a same particular destination of the transport network, wherein the received traffic is in packet form, the method further comprising:

inspecting a header of a packet in the received traffic for a destination address; and performing a look-up of the destination address in a forwarding table to retrieve the mapping.

6. A method according to claim 4 wherein the Layer 1 transport network is configured to carry a plurality of different traffic types and wherein the traffic types are selected from: Internet Protocol (IP) traffic, Multi Protocol Label Switched (MPLS) traffic, Ethernet traffic and Time Division Multiplexed (TDM) traffic.

7. A method according to claim 4 wherein the Layer 1 transport network is configured to carry a plurality of different traffic types, the receiving comprises receiving Layer 1 data transport units of the higher level which have been segregated according to destination of the traffic and traffic type and the switching comprises switching the received Layer 1 data transport units of the higher level such that Layer 1 data transport units of the higher level carrying traffic destined for other nodes bypass higher layer processing at the node and Layer 1 data transport units of the higher level carrying traffic destined for the node are switched to a local output of the node connected to a processing unit for the traffic type carried by the Layer 1 data transport units of the higher level.

8. A method according to claim 4 wherein the Layer 1 data transport units of the higher level which have been segregated according to at least one of: traffic type and destination of traffic are received on pre-configured input ports of the node and the switching is a pre-configured switching between an input port and an output port.

9. A method according to claim 4 wherein an overhead associated with the received Layer 1 data transport unit of the higher level carries identification information which identifies at least one of: traffic type and destination of traffic within the Layer 1 data transport unit of the higher level and the method further comprises:

performing a look up of the identification information in a stored table to determine a switching destination of the Layer 1 data transport unit of the higher level; and switching the received Layer 1 data transport unit of the higher level to an output port of the network equipment based on the look up.

10. A method according to claim 4 wherein the Layer 1 transport network is an Optical Transport Network (OTN).

11. A method according to claim 10 wherein the Layer 1 data transport units of the given level and of the higher level are Optical Data Units (ODU).

12. Network equipment for use at a node of a Layer 1 transport network which is arranged to transport traffic across the network in Layer 1 data transport units, the network equipment comprising:

an input for receiving traffic, wherein the received traffic is in the form of Layer 1 data transport units of a first level and wherein the received Layer 1 data transport units of the first level are not all intended for a same destination; and a mapping unit arranged to produce Layer 1 data transport units of a second level that is different from the first level by mapping the received Layer 1 data transport units of the first level to the Layer 1 data transport units of the second level that is different from the first level, wherein the mapping is at least according to destination, such that the received traffic is segregated into Layer 1 data transport units of the second level, with each Layer 1 data transport unit of the second level carrying a plurality of Layer 1 data transport units of the first level that are each destined for only a particular destination of the transport network, wherein the Layer 1 transport network is configured to carry a plurality of different traffic types and the mapping unit is arranged to map the received traffic to Layer 1 data transport units of the second level according to destination and traffic type, such that the received traffic is segregated into Layer 1 data transport units of the second level, with each Layer 1 data transport unit of the second level carrying a particular one of the traffic types and traffic for a particular destination of the transport network.

13. Network equipment according to claim 12 which is further arranged to add identification information to an overhead section associated with the Layer 1 data transport unit of the second level to indicate at least one of: traffic type and destination of the traffic carried within the Layer 1 data transport unit of the second level.

14. Network equipment according to claim 12 for use at a node of an Optical Transport Network (OTN).

15. Network equipment according to claim 14 wherein the Layer 1 data transport units of the given level and of the higher level are Optical Data Units (ODU).

16. Network equipment for use at a node of a Layer 1 transport network which is arranged to transport traffic across the network in Layer 1 data transport units of a higher level, the network equipment comprising:

an input for receiving Layer 1 data transport units of the higher level at the node, wherein each Layer 1 data transport unit of the higher level carries Layer 1 data transport units of a given level that is lower than the higher level and which have been segregated at least according to destination of the traffic such that each Layer 1 data transport unit of the higher level carries a plurality of Layer 1 data transport units of the given level that are each destined for only a same particular destination of the transport network; and a switching unit arranged to switch the received Layer 1 data transport units of the higher level according to destination, wherein the switching unit:

switches the received Layer 1 data transport units of the higher level such that Layer 1 data transport units of the higher level carrying traffic destined for other nodes bypass higher layer processing at the node; and switches the received Layer 1 data transport units of the higher level such that Layer 1 data transport units of the higher level carrying traffic destined for the node are switched to a local output of the network equipment.

17. Network equipment according to claim 16 wherein the Layer 1 transport network is configured to carry a plurality of different traffic types, the input is arranged to receive Layer 1 data transport units of the higher level which have been segregated according to destination of the traffic and traffic type and the switching unit is arranged to switch the received Layer 1 data transport units of the higher level such that Layer 1 data transport units of the higher level carrying traffic destined for other nodes bypass higher layer processing at the node and Layer 1 data transport units of the higher level carrying traffic destined for the node are switched to a local output of the network equipment connected to a processing unit for the traffic type carried by the Layer 1 data transport units of the higher level.

18. Network equipment according to claim 16 wherein an overhead associated with the received Layer 1 data transport unit of the higher level carries identification information which identifies at least one of: traffic type and destination of traffic within the Layer 1 data transport unit of the higher level and the network equipment is arranged to perform a look up of the identification information in a stored table to determine a switching destination of the Layer 1 data transport unit of the higher level, and the switching unit is arranged to switch the received Layer 1 data transport unit of the higher level to an output port of the network equipment based on the look up.

19. A nontransitory machine-readable storage medium having stored therein instructions for causing a processor to perform a method of processing traffic at a node of a Layer 1 transport network which is arranged to transport traffic across the network in Layer 1 data transport units, the method comprising:

receiving traffic at the node, wherein the received traffic is in the form of Layer 1 data transport units of a first level and wherein the received Layer 1 data transport units of the first level are not all intended for a same destination; and producing Layer 1 data transport units of a second level that is different from the first level by mapping the received Layer 1 data transport units of the first level to the Layer 1 data transport units of the second level that is different from the first level, wherein the mapping is at least according to destination, such that the received traffic is segregated into Layer 1 data transport units of the second level, with each Layer 1 data transport unit of the second level carrying a plurality of Layer 1 data transport units of the first level that are each destined for only a particular destination of the transport network, wherein the Layer 1 transport network is configured to carry a plurality of different traffic types and the mapping comprises mapping the received traffic to Layer 1 data transport units of the second level according to destination and traffic type, such that the received traffic is segregated into Layer 1 data transport units of the second level, with each Layer 1 data transport unit of the second level carrying a particular one of the traffic types and traffic for a particular destination of the transport network.

* * * * *